Figure 1:
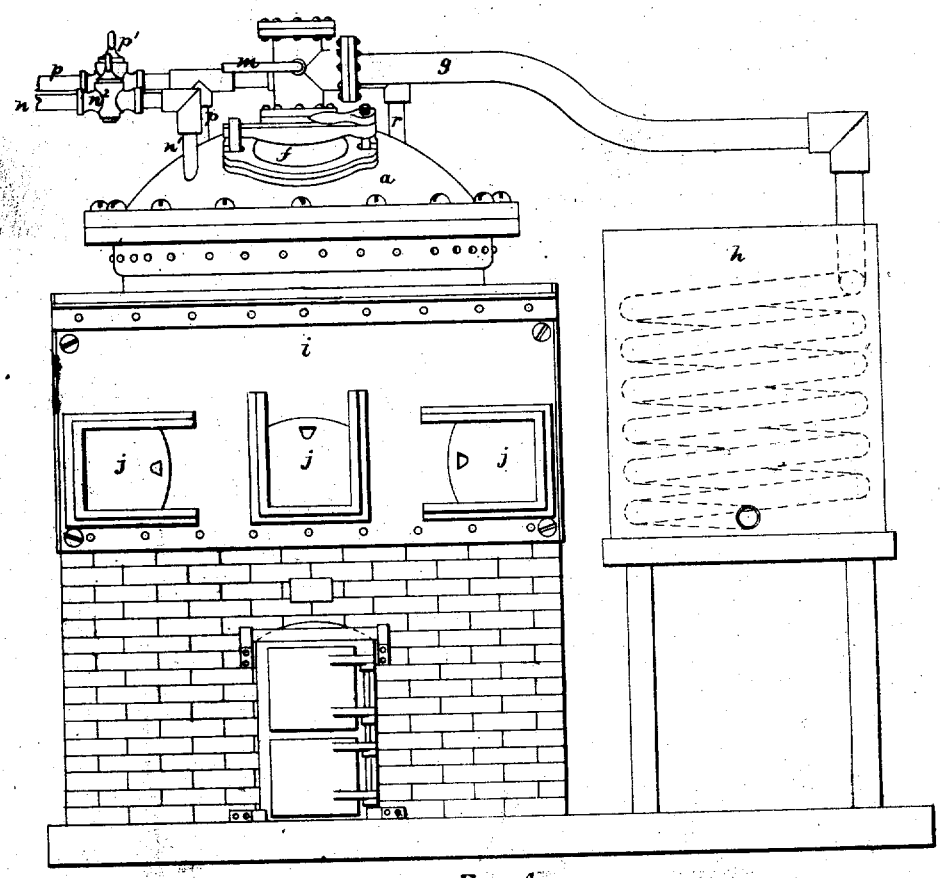

2 Sheets—Sheet 1.

J. MERRILL.

PRODUCTION OF DEODORIZED HEAVY HYDROCARBON OILS.

No. 7,826. Reissued July 31, 1877.

WITNESSES:

William W. Swan

H. G. Olmsted

INVENTOR:

Joshua Merrill

2 Sheets—Sheet 2.

J. MERRILL.

PRODUCTION OF DEODORIZED HEAVY HYDROCARBON OILS.

No. 7,826. Reissued July 31, 1877.

WITNESSES:

William W. Swan

H. G. Olmsted

INVENTOR.

Joshua Merrill

UNITED STATES PATENT OFFICE.

JOSHUA MERRILL, OF BOSTON, MASSACHUSETTS.

IMPROVEMENT IN THE PRODUCTION OF DEODORIZED HEAVY HYDROCARBON OILS.

Specification forming part of Letters Patent No. 90,284, dated May 18, 1869; Reissue No. 7,733, dated June 12, 1877; Reissue No. 7,826, dated July 31, 1877; application filed July 5, 1877.

*To all whom it may concern:*

Be it known that I, JOSHUA MERRILL, of the city of Boston, in the county of Suffolk and State of Massachusetts, have invented certain new and useful Improvements relating to the Manufacture of Heavy Hydrocarbon Oils, consisting of, first, an improved heavy hydrocarbon oil; second, a process by which such oils are produced or manufactured; third, a device or arrangement of devices for superheating steam in carrying on said process or other process of distillation; and I do hereby declare that the following is a full and correct description thereof.

My invention relates to the heavy hydrocarbon oils which have heretofore been produced by distilling crude petroleum, or the crude oils obtained from the distillation of bituminous coals, bituminous shales, bituminous schists, asphaltum, and other substances producing hydrocarbon oils by distillation.

It has been the practice to treat such heavy oils with acids and alkalies for the purpose of removing the disgusting odor peculiar to these oils, which renders them extremely objectionable for use in the arts and for lubricating purposes.

Such processes are well known, and improve the character of the odor of the oils; but, nevertheless, the oils so treated have a persistent disagreeable smell, which makes them offensive and undesirable for use in close warm rooms, as in woolen-manufactories.

Attempts have been made to remove the smell by filtration, with but partial success.

To make heavy hydrocarbon oils free from the characteristic unpleasant odors of heavy hydrocarbon oils, I take the heavy oils which have been separated from the lighter oils and from mechanical impurities by distillation, and after chilling and expressing the solid paraffine, when such operation is necessary, place them in a still, heated by a fire underneath, and slowly and gradually raise the temperature until from ten to thirty per cent. of the contents of the still are distilled over, when the still is cooled down and the remaining contents removed.

The matters which go over to the condenser have a very foul, offensive, and disgusting odor; but the oil remaining in the still, if the operation has been properly conducted, is free from the characteristic offensive odor of hydrocarbon oils, and has no smell except a slight odor similar to that of fatty oils. It can be mixed, in all proportions, with sperm, lard, fish oils, and vegetable oils, and is so neutral in its character that it takes the odor of the oil that it is mixed with. If mixed with twenty per cent. of sperm-oil, it does not perceptibly change the smell of the sperm-oil.

The process may be conducted in a common still, heated by fire-heat, as above mentioned, but will be facilitated, and oil of lighter color produced, by introducing superheated steam into the heated oil within the still, as hereinafter more fully described.

When operating by this process upon the paraffine heavy oils obtained from petroleum, bituminous coals and shales, and substances producing paraffine oils, I carry on the distillation until the oil which comes from the condenser has a specific gravity of 36° Baumé's hydrometer, when, if the process be stopped, the remaining oil in the still is inodorous, or free from empyreumatic odors; but by carrying on the distillation further, and raising the temperature until the oil running from the condenser has a specific gravity of 32° Baumé, the remaining oil will be thicker or more oily, and yet inodorous.

When operating upon heavy oils made from asphaltum, I continue the distillation until the oil running over from the condenser has a specific gravity of from 28° to 25° Baumé's hydrometer.

The temperature within the still will depend upon the character of the oil acted upon, and upon the mode of working the still.

When superheated steam is used the temperature is much lower than when the operation is conducted without it, the steam materially assisting in vaporizing the matter that it is desirable to remove.

It is not practicable to specify particularly the specific gravity of the heavy oils used in producing my improved oil. These oils are well known to the trade, and distinguished from the lighter burning-oils and naphthas by the term "heavy oils," their specific gravity varying greatly between the asphaltum oils and paraffine oils.

Heavy hydrocarbon oils produced from the same substances vary considerably in specific gravity, by reason of the presence of more or less of the lighter oils which are always to be found mixed with them, and, therefore, the percentage of oil that is to be distilled over in working this process will vary considerably.

I do not assume to know the reason why the above-described process produces heavy oils free from the characteristic odors of hydrocarbon oils, but suppose that these odors arise from matters resulting from decomposition at the temperature at which the heavy oils vaporize and go over, and that these matters, after they are condensed with the heavy oils, will vaporize at a temperature lower than that required to vaporize and distill over the heavy oils, and, therefore, may be separated from the heavy oils by distillation in a close still at a temperature below that required to distill over the heavy oil, which, not being vaporized, will remain free from the odorous matters which would result from decomposition at the temperature required to vaporize it and distill it over.

In carrying on my process to make my improved oil, I use the heavy hydrocarbon oils for sale in the market, whether they have been treated by chemicals or not, the result of the process in either case being the same.

Figure 2:
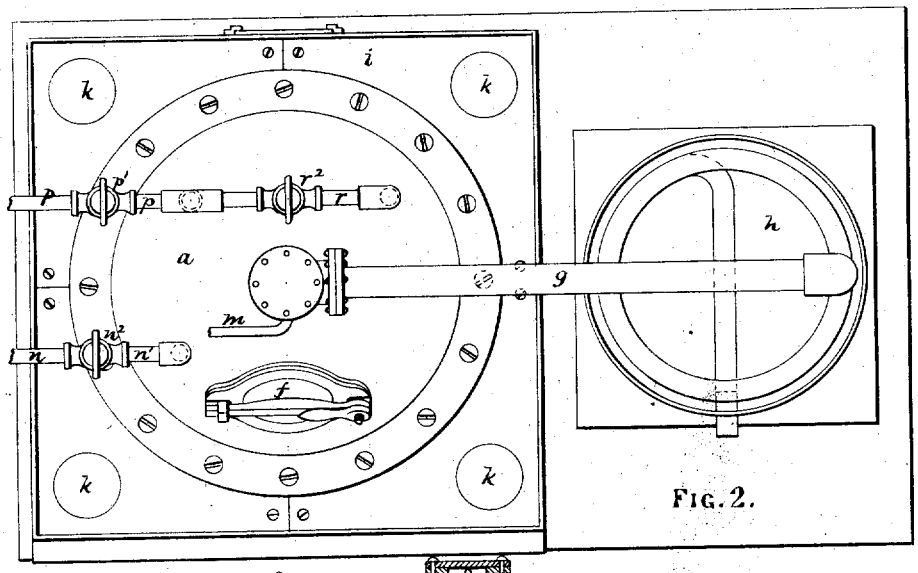
Figure 3:
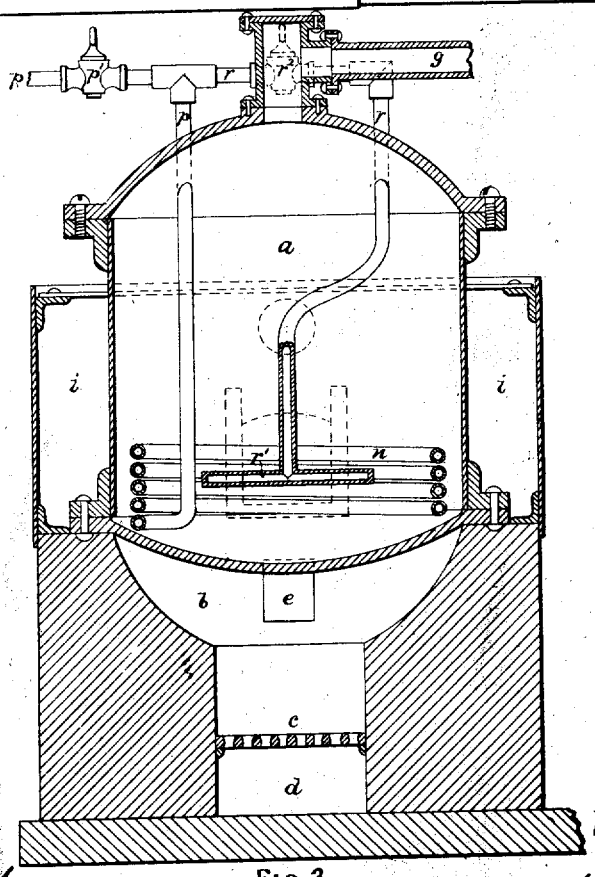

The accompanying drawings represent the distilling apparatus I prefer to use in carrying out my invention, Figure 1 being a front elevation of the still and condenser; Fig. 2, a plan view; and Fig. 3 a vertical cross-section of the still and furnace.

Letter *a* represents the still; *b*, the fire-place, formed in brick-work, upon which the still is placed, the fire being applied to the bottom of the still; *c*, the grate; *d*, the ash-pit; *e*, the outlet from the fire-place to the chimney; *f*, the man-hole for access to the interior of the still, covered by a suitable man-hole plate; *g*, the goose-neck or pipe leading from the still to the condenser *h*; *i*, the casing surrounding the still, provided with doors *j j j*, covering apertures in front of the casing, and lids *k k k k*, covering circular apertures in the top of the casing, designed to be opened to admit air to the body of the still within the casing, in order to regulate the temperature of the still, or to cool it down rapidly when the fire is removed from below. *m* is a small filling-pipe, shown broken off in the drawing, but which should be connected with a pump or reservoir of oil, and furnished with a shut-off cock, to be closed when the still is filled.

So far the apparatus is substantially the same as that described in the Letters Patent of the United States granted to me July 30, 1861.

I will now proceed to describe an apparatus that I have since invented for superheating steam and applying it to the heated oil within the still, and which may be used with any still heated by a fire.

I place a perfectly-tight coil of steam-pipe, *n*, within the still, at or near the bottom, and connect one end of the coil with a steam-boiler by a pipe, $n^1$, which passes through the top of the still, and is furnished with a cock, $n^2$, to control the admission of steam to the coil. The other end of the coil is connected with an outlet-pipe, *p*, which passes up through the top of the still. A stop-cock, *p'*, is placed near the open end of the outlet-pipe. A return-pipe, *r*, connected with the outlet-pipe between the stop-cock and the still, passes down into the still, terminating in a horizontal discharge-pipe, $r^1$, perforated, as usual, with small holes for the escape of the superheated steam into the oil. The return-pipe *r* has a stop-cock, $r^2$, to control the passage of the superheated steam from the outlet-pipe through the return pipe to within the still, so that, when it is shut, no superheated steam passes into the oil.

The advantage of this arrangement of the superheating coil and pipes is that the steam is superheated in the coil to about the temperature of the oil it is to be applied to by the heat of the oil itself, and then carried above the top of the still through the outlet-pipe, in order that the operator may, by turning the cock *p'* near the open end of the outlet-pipe, discharge any water that has got into the coil, and ascertain when the steam has become sufficiently superheated before letting it into the oil within the still through the return-pipe.

It is obvious that this arrangement of pipes for superheating and discharging superheated steam into the oil can be used for any operations carried on in stills which require superheated steam of about the temperature of the contents of the still.

In carrying on my new manufacture of deodorizing heavy oils with this apparatus, I place the heavy oil to be deodorized in the still, and heat it by the fire beneath to the required temperature to commence the operation, the steam being shut off from the coil and the outlet-cock being opened to admit of the expulsion of any water from within the coil.

When the oil is heated to from about 220° to 300° Fahrenheit's thermometer, depending upon the boiling-points of the oils treated, which vary greatly, I open the steam-cock carefully, and let steam pass into and through the coil, wherein it becomes rapidly superheated to about the temperature of the oil.

Having ascertained that the steam passing through the coil is sufficiently superheated, I close the outlet-cock, and then carefully open the cock in the return-pipe, and let a small amount of superheated steam pass down into the still, where it escapes, by the small openings through the pipe, into the body of the hot oil.

The superheated steam passes up through the body of the oil and over to the condenser, carrying along with it the more volatile portions of the oil, which condense and flow from the condenser into a tank provided for their reception.

I continue this operation, keeping the fire dull and moderate under the still, and the temperature slowly rising all the time, until I distill off all the volatile matters, which readily flow out with the steam, usually distilling off from twenty to thirty per cent., as the case may be.

I now draw out the fire, then shut off the steam, and leave the oil to cool in the still. When cool it is drawn into suitable tanks, and is ready for sale and use.

It has been so completely divested of its fetid and pungent odors, having only a slight smell like a fatty oil, and has become so oily as to be greatly improved and increased in value as a lubricating-oil, or for any purposes for which it may be used, either alone or mixed with other oils.

I prefer to use superheated steam in working the above-described process, because I can work at lower temperature than by the fire-heat alone; but I do not wish to confine this part of my invention to the use of superheated steam in combination with the fire, because I can accomplish the same result by fire-heat alone applied to the still, or by any known mode of heating a still which will heat the oil sufficiently to distill over the portions of the oil necessary to be removed; but in that case I am obliged to conduct the process at higher temperatures, and the remaining oil left in the still is darker in color than when superheated steam is used in combination with the fire-heat.

From the above it will be obvious that a part of my invention consists in a new process for producing heavy hydrocarbon oils, suitable for lubricating and other purposes, and free from the characteristic odors of heavy hydrocarbon oils, from heavy hydrocarbon oils, by distilling from them the volatile matters from which the objectionable odors arise, and, at the same time, preventing new formations of such matters, by keeping the temperature of the oil in the still below that at which these matters form by decomposition of the oil.

It will also be evident to those skilled in the art that this part of my invention will be used, if the above-mentioned process be worked to produce the deodorized heavy oils above described, from distilled hydrocarbon oils, from which the lighter burning-oils and naphthas have not been separated so long as they contain heavy oils, because the naphtha and lighter oils will go over first, leaving the heavy oil in the still to be operated upon; and also because, as before stated, the distilled heavy oils always contain more or less of the lighter bodies, owing to the breaking up of a portion of the heavy crude oil in the process of distillation.

I claim—

1. The above-described heavy hydrocarbon oil, suitable for lubricating and other purposes, free from the characteristic odors of hydrocarbon oils, and having a slight smell like fatty oil.

2. The above-described new manufacture of deodorized heavy hydrocarbon oils, suitable for lubricating and other purposes, free from the characteristic odors of hydrocarbon oils, and having a slight smell like fatty oil, from heavy hydrocarbon oils, by treating them substantially as hereinbefore described.

3. In combination with a still suitable for distilling oils, the superheating-coil, with its steam-pipe, outlet-pipe, and return-pipe, and their stop-cocks, arranged substantially as described.

JOSHUA MERRILL.

Witnesses:
WILLIAM W. SWAN,
H. G. OLMSTED.